Figure 1:
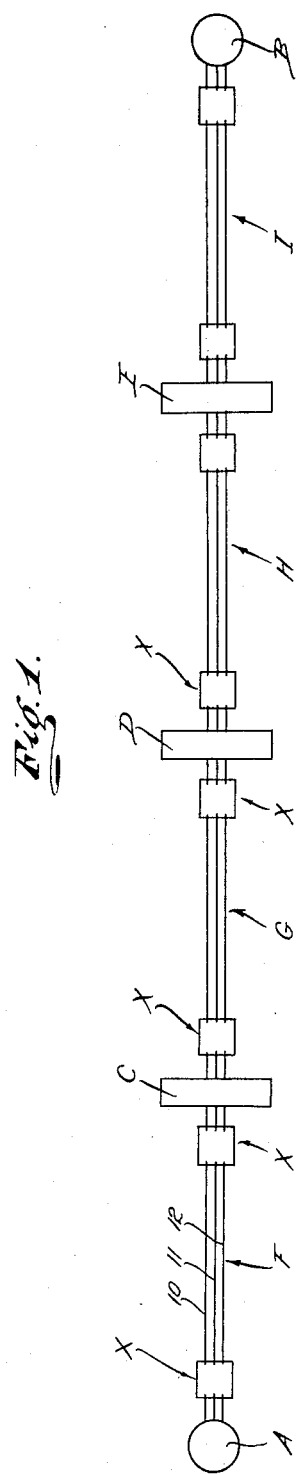

Dec. 19, 1933.  L. F. HUNT ET AL  1,940,303
SYSTEM FOR POWER LINE PROTECTION
Filed May 6, 1932  2 Sheets-Sheet 1

Inventors
Lloyd F. Hunt
and
Fred B. Doolittle
By
Their Attorney

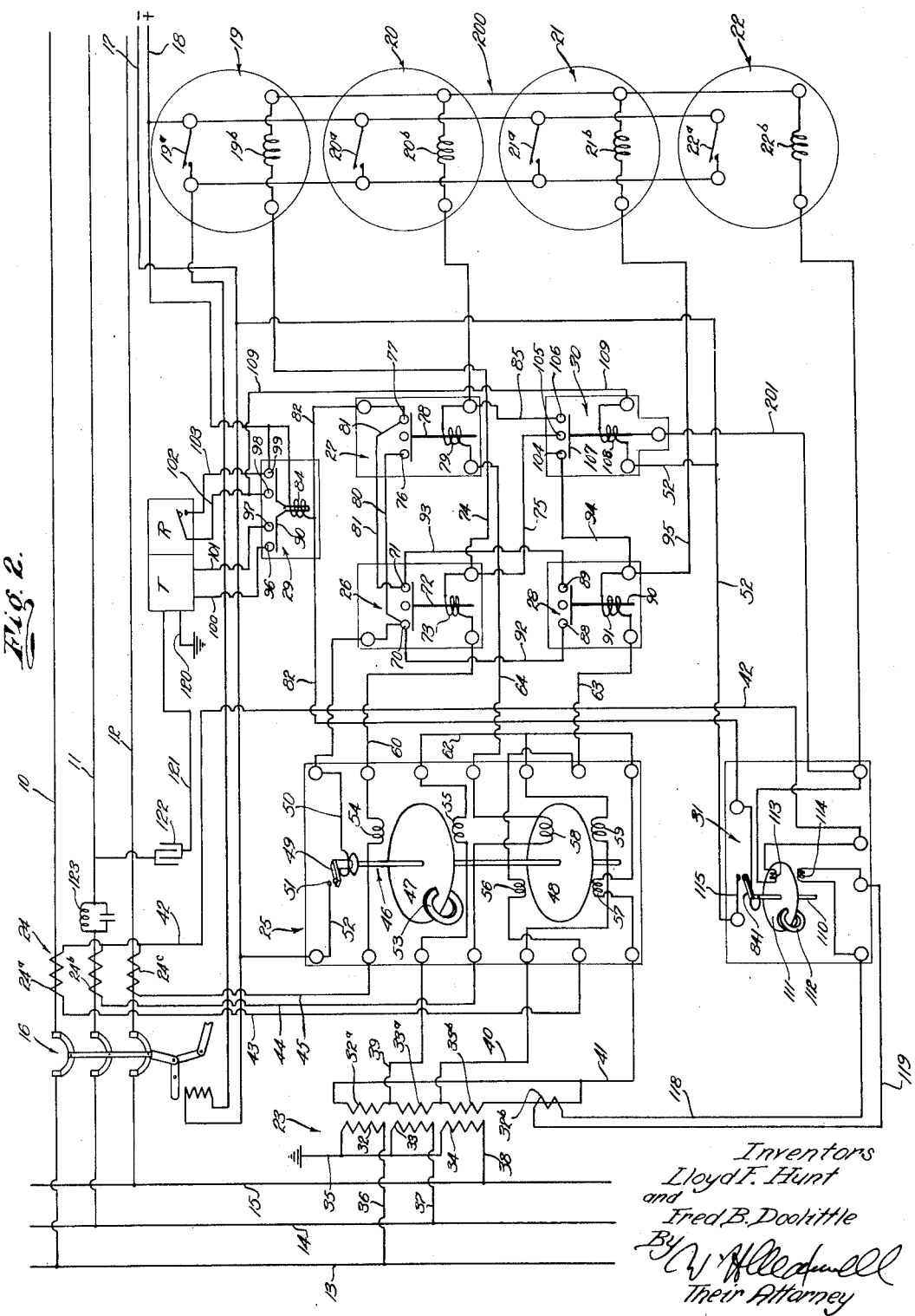

Patented Dec. 19, 1933

1,940,303

UNITED STATES PATENT OFFICE 1,940,303

SYSTEM FOR POWER LINE PROTECTION

Lloyd F. Hunt, Los Angeles, and Fred B. Doolittle, Glendale, Calif.

Application May 6, 1932. Serial No. 609,662

13 Claims. (Cl. 175—294)

This invention relates to a system for protecting power distributing lines, and it is a general object of the invention to provide a simple, effective, dependable and rapidly operating line protecting system.

Electrical distributing systems usually involve two sources of power delivering energy to a single main circuit, which circuit is divided into sections by sub-stations. In practice, there are times when trouble or faults develop in the sections of such power lines, making it desirable to disconnect or cut out a section as it becomes faulted without cutting out the other sections. Protective systems have been developed and used for accomplishing this purpose, it being common practice to equip power lines with circuit breakers controlled by directional over-load relays. The usual installation of this type involves circuit breakers at both ends of each section of the power line and directional overload relay mechanisms at the circuit breakers. The relay mechanisms in the protective systems heretofore available have made it necessary to introduce features of time delay in the relays in order to prevent simultaneous operation of all of the relays and their connected circuit breakers upon a fault occurring in any one section of the circuit. With time delay factors involved in a protective system, it may take a comparatively long time for a line section to be cut out, and during such period of time, damage may be done to the entire system or to equipment operated from the system.

It is a primary object of this invention to provide a power line protecting system which is extremely rapid in operation and which is operable to disconnect or cut out any section of the power line immediately upon a fault occurring in such section, and without requiring a cumulative time delay in order to prevent the disconnecting of other sections of the system.

It is another object of this invention to provide a protective system of the general type mentioned in which signals are communicated between the units of the protective system to control the action of the units of the protective system without the necessity of time delay.

Another object of this invention is to provide a protective system of the general character mentioned, which is simple, and also effective and dependable in operation.

Various objects and features of our invention will be best and more fully understood from the following detailed description of a typical form and application of the invention throughout which description we will refer to the accompanying drawings in which:

Fig. 1 is a general diagrammatic view of a power system employing a protective system of the present invention and Fig. 2 is an enlarged diagrammatic view illustrating the details of a single unit of the system.

The protective system contemplated by our present invention is applicable, generally, to power distributing systems, and may be applied to advantage to power systems in which the power is handled through the various wiring systems usually employed in handling electrical energy. It is to be understood, of course, that in applying the invention to power distributing systems of various types, certain modifications and variations may be necessary. Further, the present invention is primarily concerned with a protective system and not with detailed units of equipment such as individual relays, transformers, circuit breakers, etc.

In setting forth the invention, reference is being made to certain types and arrangements of relays and other parts, such reference being primarily for the purpose of setting forth one particular application of the invention, and is therefore not to be construed as limiting the scope or nature of the invention. In the drawings to which reference will be made, we have illustrated in Fig. 2, a unit of a protective system embodying the invention, and have illustrated various devices or parts in such system in a general or diagrammatic form in order to avoid needless and confusing details such as might appear where the individual devices set forth in detail.

In the diagram Fig. 1 we disclose a power system of a type and arrangement commonly employed by power distributing companies. We have, in this diagram, illustrated two spaced sources of power A and B connected by a single power line carried by three main conductors 10, 11 and 12, the circuit being a three phase circuit with or without a grounded neutral. The circuit between the sources of power A and B is divided into several sections F, G, H and I by means of sub-stations C, D and E.

In accordance with the general principles of the present invention, a unit X of protective equipment is employed at each end of each section of the power circuit, the several units X of the protective system being inter-connected through a signaling system as will be hereinafter more fully described. We will first set forth in detail a single unit X of the protective system, that is, a unit such as occurs at each end of each section of the main circuit, it being understood that such description applies equally to all of the protective units in the system.

Referring now to Fig. 2 of the drawings, wherein we illustrate one complete unit X of the system of our invention, we will first designate the main or principal parts. The unit about to be described being located at one end of one section of the power system is shown in combination with the main lines 10, 11 and 12 of the main circuit, and substation bus-bars 13, 14 and 15 connected with the lines 10, 11 and 12, respectively.

The unit involves a circuit breaker 16 connected to the main lines 10, 11 and 12 immediately ahead of the connection of such lines with the bus-bars 13, 14 and 15. The circuit breaker 16 is adapted to be operated by a battery or other power circuit of the sub-station. In the diagram it is shown connected for operation by current carried by lines 17 and 18. The breaker operating circuit includes a plurality of relays which control the current carried by the lines 18 and 17, and which are governed by the control means of the present invention as will be hereinafter described. In the particular application of the invention being set forth, we illustrate three short time delay over-current phase relays 19, 20 and 21, and short time delay over-current ground relay 22 connected in the circuit carried by lines 17 and 18 so that the closing of any one of the said relays completes the circuit, and results in operation of the circuit breaker 16. In the equipment illustrated diagrammatically in the drawings, the relays 19, 20 and 21 and 22 have normally open contacts 19$^a$, 20$^a$, 21$^a$, and 22$^a$, respectively, for controlling the circuit to the circuit breaker 16.

The control means of the present invention involves parts which connect the circuit breaker controlling relays 19, 20, 21 and 22 with the lines 10, 11 and 12 of the main power line so that a fault or pre-determined disturbance in the circuit of the main line causes operation of one of the said relays and it further includes means inter-connecting the units X at the two ends of the main circuit section.

The control means of the present invention as illustrated in the diagram Fig. 2 includes a potential transformer 23 and a current transformer 24 both connected for energization by the main power circuit. The current transformer 24 is shown applied to the main power lines 10, 11 and 12, while the potential transformer is shown connected with the bus-bars 13, 14 and 15. A directional relay 25 responsive to direction of three phase power flow is connected with the transformers and with fast over-current relays 26, 27 and 28. A lock-out relay 29 is operated through the contacts of the relays just mentioned to start the signal transmitter T through contacts 96 and 97 and to energize the coil of a cut-out relay, 30 through contacts 98 and 99. The closing of the contacts of cut-out relay 30, cuts out relays 19, 20, 21 and 22 by short circuiting the coil of relay 19 through contacts 104 and 107, of relay 20 through contacts 106 and 107 of relay 21 through contacts 104 and 107 and relay 22 through the combination of contacts 104, 105 and 106 with 107. A directional residual relay 31 is energized with residual voltage from the delta connected secondary of the potential transformer 23 by means of a transformer 32$^b$ through which the delta is closed, and with residual current from the current transformers, star connected after passing through relays 25, 26, 27, 28 and 19, 20, 21 and the residual lead through relays 22 and 31 and back to the common point of the three current transformers.

The potential transformer 23 may have three primary windings, 32, 33 and 34, each having one pole connected to ground through a connection 35 and having their other poles connected to the bus-bars 13, 14 and 15 by connections 36, 37 and 38, respectively. Secondary windings 32$^a$, 33$^a$ and 33$^b$ are related to the primary windings 32, 33 and 34, respectively. The windings 32$^a$ and 33$^a$ are connected together and to a line 39 which extends from the transformer 23 to one potential coil, 55, of the directional relay 25. Windings 33$^a$ and 33$^b$ are connected together and to a line 40 which connects with another potential coil, 59, of the directional relay 25. Windings 32$^a$ and 33$^b$ are connected together and to a line 41 which connects with another potential coil, 57, of the directional relay 25. The winding 32$^b$ hereinabove mentioned is arranged to be excited by flow in the delta formed by the inter-connection of 32$^a$, 33$^a$ and 33$^b$, as will be apparent from the diagram.

The current transformers 24 include, primarily, three windings 24$^a$, 24$^b$ and 24$^c$ related to the main lines 10, 11 and 12, respectively. One pole of each winding is connected to a common line 42 which extends from the current transformers to the relay 31. The other poles of the windings 24$^a$, 24$^b$ and 24$^c$ connect to lines 43, 44 and 45, respectively, which connect to current coils of the relay 25 as will be hereinafter described.

The power directional relay 25 illustrated diagrammatically in the drawings includes, generally, a unit 46 mounted for rotation, which unit carries discs 47 and 48, and a contact 49. The contact 49 is connected with a line 50 and is adapted to cooperate with a contact 51 connected by a line 52 with one side of the operating circuit of the sub-station. The rotation of the unit 46 is damped by a fixed field element 53 related to the disc 47, and the direction of torque on the unit 46 is governed by windings 54 and 55 related to the disc 47, and windings 56, 57, 58 and 59 related to the disc 48. One pole of the winding 54 is connected with the line 45 from the transformer 24$^c$, while the other pole of the winding 54 is connected with relay 26 by line 60. One pole of the winding 56 is connected with the line 43 from the transformer 24$^a$, while the other pole of the winding 56 is connected with the relay 28 by a connection 63. One pole of the winding 58 is connected with line 44 from the transformer 24$^b$ while the other pole of the winding 58 is connected with relay 27 by line 64.

The relay 26 is a fast or instantaneous over-current relay including stationary contacts 70 and 71, and a movable contact 72 controlled by winding 73. The contact 70 is connected with line 50 from the relay 25, while the contact 71 is connected with relay 27 by a line 81. One pole of the relay winding 73 is connected with the line 60 from the relay 25, while the other pole connects with lines 74 and 75 which connect with relays 19 and 30, respectively.

The relay 27 is a fast or instantaneous over-current relay including stationary contacts 76 and 77, a movable contact 78, and a winding 79 controlling the contact 78. The contact 76 is connected with the contact 70 of relay 26 by a line 80, while the contact 77 is connected with contact 71 of relay 26 by line 81 and with a line 82 which extends to a winding 84 of relay 29 and to the movable contact 84$^1$ of relay 31. One pole of the winding 79 is connected with the line 64 from relay 25, while the other pole is connected with the relay 30 by a line 85. The relay 28 is a fast or instantaneous over-current relay having stationary contacts 88 and 89 and a movable contact 90 controlled by winding 91. The contact 88 is connected to contact 70 of relay 26 by a line 92, while contact 89 is connected with contact 71 of relay 26 by a line 93. One pole of the winding 91 is connected with line 63 from relay 25, while the other pole of the winding 91 is connected with the relay 30 by line 94, and to relay 21 by line 95.

The lock-out relay 29 includes stationary contacts 96, 97, 98 and 99, a movable contact 90, and the winding 84. The contacts 96 and 97 are connected by means of lines 100 and 101 with a signal transmitter T, while the contacts 98 and 99 are connected by means of lines 102 and 103 in parallel with the contacts of a signal receiver R and the contact 98 is connected by line 109 to coil 108 of relay 30.

The cut-out relay 30 includes stationary contacts 104, 105, and 106, a movable contact 107 and a winding 108. The contact 104 is connected with line 94 from the winding of relay 28. The contact 105 is connected with line 75 from relay 26, while contact 106 is connected with line 85 from relay 27. One pole of the winding 108 is connected with one side of the sub-station circuit by line 52, while the other pole is connected with line 102 to the receiver R by a line 109.

The ground relay 31 includes a rotatable unit 110 carrying a contact 841 and a disc 111. The rotation of the unit 110 is damped by a fixed field piece 112 and the direction of torque on 110 is governed by windings 113 and 114. The contact 841 is adapted to cooperate with a fixed contact 115 connected with line 52. The contact 841 is connected with relay 27 by line 82. The winding 113 has one pole connected with line 201 from relay 30 and 22 and has the other pole connected with line 42 from transformers 24. The winding 114 has one pole connected with one pole of the winding $32^b$ by line 118 and has the other pole connected to the other pole of the winding $32^b$ by line 119.

The inter-connection between the units of the control system located at the ends of each section of the power line is an important and outstanding feature of the present invention, as it makes possible the total elimination of the time delay factor required for proper selectivity in systems heretofore used. We have found in practice, that it is advantageous to employ a wired radio connection, it being understood, however, that any other signaling connection may be employed without departing from the principles of the present invention.

In the form of the invention illustrated in the drawings, there is a signal transmitter T and a signal receiver R at each unit as above described. The transmitter T and receiver R have one pole connected to ground through a ground connection 120, and the other connected with one of the main lines of the power circuit, for instance, the line 11 through a connection 121 provided with a coupling capacitor 122, the line 11 being provided with a radio frequency trap 123.

The transmitters and receivers of the units X at the two ends of each section are connected either by wired circuits, by carrier current, or by other means and are isolated or separated from the transmitters and receivers of the other units X of the system so that a signal sent by a transmitter in any one section operates only the receiver at the opposite end of that section. We have shown tuned traps 123 of the unit X for confining the signals to the desired sections of the system.

The protective system of the present invention as above described is responsive to various fault conditions in the main power circuit and is selective to disconnect only the section of the power circuit in which the fault occurs.

In describing the operation of the protective system, the sections of line in Fig. 1 will be considered as equipped at both ends with units X constructed as above described, for example, the action of the relays at the ends of the section H, assumed to be faulted, and the action of the relays at the ends of section G, assumed to be clear, will be explained for the following fault conditions:

I Three phase fault
II Phase to phase fault
III Two phase to ground fault
IV One phase to ground with high fault resistance
V One phase to ground with low fault resistance.

I. Assume the three main conductors 10, 11 and 12 short circuited in section H of Fig. 1. Then the equipment at stations D and I associated with the circuit breakers connecting line section H to the station busses will perform as follows:

Referring to Fig. 2, overload current will flow from the station busses 13, 14 and 15 through circuit breaker 16, through current transformers 24 and thence via the main line to the short circuit. The short circuit current through current transformers 24 will induce heavy secondary current in windings $24^a$, $24^b$, and $24^c$ which connect through the current coils of relay 25, 26, 27 and 28 and through $19^b$, $20^b$ and $21^b$ to the common wire 200 where the phase currents will neutralize if the three phase fault is balanced, thus leaving no residual current to pass through relays 22 and 31 and back to the connection common to the thru current transformer secondaries $24^a$, $24^b$ and $24^c$. Since the fault current flows from the bus to the short circuit, the direction of the secondary current in $24^a$, $24^b$, and $24^c$ is such that, in passing through the current coils 54, 58, and 56 of power directional relay 25, it tends to rotate element 46 in the direction that holds contacts 49 and 51 open. In passing through the coils of relays 26, 27 and 28 the current will close the contacts of these relays, but since the contacts of relays 26, 27 and 28 are in series with the contacts of relay 25 which are open, nothing further occurs. Since the contacts of relay 30 are open, the current from the coils of 26, 27 and 28 cannot pass through lines 75, 85 and 94 but must go on through the coils of relays 19, 20 and 21 causing them to close their contacts after a slight time delay. Closing the contacts of 19, 20 or 21 will energize the trip coil of circuit breaker 16 from the station operating circuit carried by lines 17 and 18, thus opening circuit breaker 16 and clearing the faulted section of line from the bus, 13, 14 and 15. The action just described takes place in the equipment at both ends of line section H thus clearing from the system, section H of Fig. 1 which was assumed to contain the three phase fault.

In order that the other sections of line F, G and I shall not trip out due to the three phase fault in section H the equipment at the ends of these sections must function. For the purpose of illustration this action will be described at the ends of section G, the functioning for the other unfaulted sections being similar to that for G.

Referring to Fig. 2 in the unit X controlling section G at station D, the fault current will be flowing from source A through station C, lines 10, 11, 12 through current transformers 24, circuit breaker 16 to bus 13, 14 and 15 at station D and thence out on section H to the three phase fault. The current flowing toward the bus thru current transformers 24 will induce heavy secondary currents in windings 24$^a$, 24$^b$, and 24$^c$ which connect thru current coils of relays 25, 26, 27, 28, 19, 20, and 21 to the common wire 200 where the phase currents will neutralize for the balanced three phase fault leaving no residual to pass through the coils of relays 22 and 31. Since the fault current in this case is flowing toward the bus through current transformers 24, the direction of the secondary current in 24$^a$, 24$^b$ and 24$^c$ is such that in passing through the current coils 54, 58 and 56 of the power directional relay 25, it tends to rotate element 46 in the direction to close contacts 49 and 51. Likewise in passing through the coils of relays 26, 27 and 28 the current will cause the closing of these relay contacts. We have now energized the coil of relay 29 from the operating current of the thru contacts 51 and 49 of relay 25, contacts 70 and 71 of relay 26 (and/or contacts 88 of relay 28, and/or contacts 76 and 77 of relay 27) through line 82 and coil 84 of relay 29 and to the other side of the source, 18. Relay 29 will now close contacts 96 and 97 starting the signal transmitter, T, and will also close contacts 98 and 99 energizing the coil of relay 30 from the operating current of the station through contacts 98 and 99, line 109, coil 108 of relay 30 and by line 52 back to line 17 of station operating current. Since the coil of relay 30 is now energized it will close its contacts, 104, 105, 106 and 107 thus connecting together lines 75, 85, 94 and 201 which provides a path for the current from current transformer secondaries 24$^a$, 24$^b$ and 24$^c$ through coils 54, 58 and 56 of relay 25, and the coils of relays 26, 27 and 28, the contacts of relay 30 back to the current transformers 24 via line 201, coil 113 of relay 31 and line 42, without going through the coils of relays 19, 20, 21 and 22 which therefore do not close their contacts. It will be noted that until the above sequence is completed and the contacts of relay 30 are closed, the coils of relays 19, 20, 21 and 22 are in the current transformer secondary circuit and are energized. For this reason, relays 19, 20, 21 and 22 are set with sufficient time delay that the contacts of relay 30 will be closed, cutting out the coils of relays 19, 20, 21 and 22 before their contacts shall have had time to close. Since the contacts of 19, 20, 21 and 22 do not close, the trip coil of circuit breaker 16 is not energized and the circuit breaker 16, connecting live section G to station D remains closed.

In order that live section G remain in service, it is necessary that the circuit breaker controlling this section at station C also remain closed. We will now refer to the breaker and unit X at station C. It will be remembered that the operation of relay 29 on this line section at station D, started operation of a signal transmitter T. This signal is received at station C by means of the receiver R which closes its contacts connecting leads 102 and 103 which energizes coil 108 of relay 30 from line 18 of the station operating circuit through line 103, the contacts of R, line 102, line 109, coil 108 and line 52 back to the other side 17 of the station operating circuit. The coil of relay 30 being energized results in the closing of its contacts, 104, 105, 106 and 107 cutting out the coils of relays 19, 20, 21 and 22 before the contacts of these relays shall have had time to close as described above. At station C, the direction of the fault current through current transformer 24 is toward the fault in section H that the directional relay contacts of relays 25 and 31 remain open, therefore it is necessary to depend upon the signal transmitted from station D to hold in circuit breaker 16 at station C.

II. A phase to phase fault in section H assuming conductors 10 and 11 to be short circuited will be cleared by the units X at the ends of section H. In this case the operation is the same as for the through phase fault above described except that there will be overload currents induced in but two of the secondaries of current transformers 24 these being 24$^a$ and 24$^b$ for the fault between line conductors 10 and 11. The contacts of relays 28 and 27 will close but will not complete any circuit since these contacts are in series with the contacts of relay 25. The coils of relays 20 and 21 will be energized, causing these relays to close their contacts which will trip the circuit breakers 16 at the ends of section H as previously described. Since the fault is between phases, no ground being involved, there will be no residual current to return through relays 22 and 31 and hence the contacts of these relays will remain open.

For the phase to phase fault in section H, the protective equipment in the other line sections must prevent their automatic disconnection from the system. The relay action is exactly the same as for the three phase fault except that in this case there will be current in only two of the three current coils of relay 25 and only relays 28 and 27 will close contacts. However, this completes the circuit energizing relay 29 which accomplishes the cutting out of relays 19, 20, 21 and 22 at the near end through relay 30 and at the far end by means of the transmitted signal exactly in the same manner as this was done in the case of the three phase fault previously described.

III. In the case of the two phase to ground fault, the phase relays will function at the various locations exactly as described for the phase to phase fault but in this case the fault is also to ground and therefore the residual relays 22 and 31 are energized. The contacts of relay 31 control the same circuit as the contacts of relays 25 and 26 (and/or 27, and/or 28), in series and for this type of fault the contacts of relay 31 will be closed or open respectively at the same stations as the contacts of 25 are closed or open so the functioning of the protective system will be the same as for the phase to phase fault previously described.

IV. In case the main line conductor 10, in section H, is faulted to ground through a high resistance and assume that the conditions of the system are such that three phase power is flowing from station D to station E through the faulted live section H and that the amount of this three phase power is in excess of the single phase fault power flowing away from station E to the high resistance fault in live section H.

In the case of the unit X in live section H at station E of Fig. 1, the three phase load power will be flowing toward station E bus and therefore relay 25 will close its contacts but the magnitude of the currents through the coils of relays 26, 27 and 28 will be so small that none of these relay contacts will close. Experience has shown that if the minimum operating current settings of relays 26, 27 and 28 are well in excess of any load currents which must be transmitted through this line section, these relays will not close their contacts for ground faults of high enough resistance that the load currents predominate over the ground fault current in determining the direction of the resultant torque on element 46 of relay 25. Since relays 26, 27 and 28 are open for this fault condition relay 29 will not be energized through the contacts of relays 25, 26, 27 and 28.

Since this is a ground fault, there will be residual current through coil 113 of relay 31, but this will be in the direction to hold the contacts of relay 31 open and therefore relay 29 will not be operated through these contacts. Since relay 29 is not operated through either of the possible paths, and no signal is received from the equipment at station D as will presently be shown, relay 30 does not operate and circuit breaker 16 is opened after slight time delay by the closing of the contacts of residual overload relay 22. This clears the faulted section of live H from station D.

Now considering the unit X in Fig. 2, section H at station D. At this unit both the three phase power flow to the load and the single phase current flow to the fault will be away from the station bus. Therefore neither relay 25 or 31 will close contacts and relays 29 and 30 will not be energized and transmitter T will not transmit. Hence the faulted section of line will be cleared at station D by the opening of circuit breaker 16 from the closing of the contacts of residual overload relay 22.

The ground fault current in line section G at station C and D would tend to operate relays 22 at these stations but this is avoided at station D by the closing of the contacts of residual directional relay 31, since ground fault current is flowing toward station D from line section G. Closing of the contacts of relay 31 completes the circuit from power source 17 through lead 115, contacts 84, lead 82 through coil 84 and back to 18, the other side of the station power source. This closes the contacts of relay 29 which starts transmitter T through contacts 96 and 97 and operates relay 30 through contacts 98 and 99. Relay 30 closes and shorts out relays 19, 20, 21 and 22 thus preventing their operation and holding line section G in service at station D. The signal transmitted by T at station D is received by R at station C which closes its contacts connecting 102 and 103 energizing the coil of relay 30 which operates and short circuits relays 19, 20, 21 and 22 preventing the closing of their contacts and holding line section G in service at station C.

V. In the case of the phase to ground fault with low fault resistance, both the residual directional and three phase power directional relays are either close or open their contacts alike at the respective stations as determined by the direction of power flow and ground fault current flow which will be the same direction for the low resistance ground fault. The action of the protective scheme at the various stations will be exactly the same as previously described from this point on.

Having described only a typically preferred form of our invention, we do not wish to limit ourselves to the specific details set forth, but wish to reserve to ourselves any changes or variations that may appear to those skilled in the art or fall within the scope of the following claims.

Having described our invention we claim:

1. A protective system for a sectional current carrying line including, protective units connected with each end of a line section, and each including a circuit breaker controlling the line, a time delay overcurrent trip relay controlling the breaker and operatively connected with a section of the line to be directly responsive to overcurrent in the line, and a cut out relay for the overcurrent time delay relay, and means connected with said line section whereby the cut out relay of a unit is operated upon overcurrent flow in a single direction in said section of the line.

2. A protective system for a sectional current carrying line including, protective units connected with each end of a line section, and each including a circuit breaker controlling the line, a time delay overcurrent trip relay controlling the breaker, a connection between the trip relay and one section of the line whereby the relay is directly responsive to overcurrent flow in the line, and a cut out relay in said connection for rendering the relay inoperative, and means connected with said line section and the cut out relay of the unit whereby the cut out relay is operated upon overcurrent flow in a single direction in said section of the line.

3. A protective system for a sectional current carrying line including, protective units connected with each end of a line section, and each including a circuit breaker controlling the line, a time delay overcurrent trip relay controlling the breaker, a connection between the trip relay and one section of the line whereby the relay is directly responsive to overcurrent flow in the line, and a cut out relay in said connection for cutting out the trip relay, and means connected with the said line section and the cut out relay whereby the cut out relay is operated upon overcurrent flow in one direction only in said line section.

4. A protective system for a sectional multi-phase current carrying line including, protective units connected with each end of a line section and each including, a circuit breaker controlling the line, a plurality of time delay trip relays controlling the breaker, connecting means connecting each phase of the line with a trip relay whereby a trip relay is operated upon overcurrent flow of predetermined duration on any phase of the line, and cut out means for the trip relays, and means connected with said line section and the cut out means of the units connected with said line section whereby the cut out means of a unit is immediately operated upon overcurrent flow in a single direction in said section of the line.

5. A protective system for a sectional current carrying line including, protective units connected with each end of a line section, and each including a circuit breaker controlling the line, a time delay trip relay controlling the breaker, a connection between the trip relay and one section of the line whereby the trip relay is energized by residual current from the line, and cutout means in said connection for rendering the relay inoperative, and means connected with said line section and the cut out means of the unit whereby the cut out means is operated upon residual current flow in a single direction in said section of the line.

6. A protective system for a sectional multi-phase current carrying line including, protective units connected with each end of a line section and each including, a circuit breaker controlling the line, a plurality of time delay trip relays controlling the breaker, connecting means between the relays and the line section including a connection with one trip relay whereby it is operated by residual current flow from the line and connections between each phase of the line and a trip relay whereby a trip relay is operated upon overcurrent flow of a predetermined duration occurring in any phase of the line section, and cut out means for the trip relays, and means connected with said line section and the cut out means of the units connected with said line section whereby the cut out means of a unit is immediately operated upon overcurrent or residual current flow in a single direction in said section of the line.

7. A protective system for a sectional current carrying line including, protective units connected with each end of a line section, and each including a circuit breaker controlling the line, a time delay overcurrent trip relay controlling the breaker and operatively connected with a section of the line to be directly responsive to overcurrent in the line, and cut out means for the time delay relay, and control means connected with said line section and the cut out means of the units connected with said line section whereby the cut out means of a unit is operated upon overcurrent flow in a single direction in said section of the line, the control means including a fast overcurrent relay operatively connected with the line section.

8. A protective system for a sectional current carrying line including, protective units connected with each end of a line section, and each including a circuit breaker controlling the line, a time delay overcurrent trip relay controlling the breaker and operatively connected with a section of the line to be directly responsive to overcurrent in the line, and cut out means for the time delay relay, and control means connected with said line section and the cut out means of the units connected with said line section whereby the cut out means of a unit is operated upon overcurrent flow in a single direction in said section of the line, the control means including a fast overcurrent relay and a lock out relay controlled by the overcurrent relay.

9. A protective system for a sectional current carrying line including, protective units connected with each end of a line section, and each including a circuit breaker controlling the line, a time delay trip relay controlling the breaker and operatively connected with a section of the line to be responsive to overcurrent in the line, and cut out means for the time delay relay, and control means connected with said section whereby the cut out means of a unit is operated upon overcurrent flow in a single direction in said section of the line, the control means including cooperating relays at each unit, one a lock out relay and the other a fast overcurrent relay.

10. A protective system for a sectional current carrying line including, protective units connected with each end of a line section, and each including a circuit breaker controlling the line, a time delay trip relay controlling the breaker and operatively connected with a section of the line to be responsive to overcurrent in the line, and cut out means for the time delay relay, and control means connected with said line section whereby the cut out means of a unit is operated upon overcurrent flow in a single direction in said section of the line, the control means including cooperating relays at each unit, one a directional relay and one a fast overcurrent relay.

11. A protective system for a sectional current carrying line including, protective units connected with each end of a line section, and each including a circuit breaker controlling the line, a time delay trip relay controlling the breaker and operatively connected with a section of the line to be responsive to overcurrent in the line, and cut out means for the time delay relay, and control means connected with said line section whereby the cut out means of a unit is operated upon overcurrent flow in a single direction in said section of the line, the control means including cooperating relays at each unit, one a directional relay, one a fast overcurrent relay and one a lock out relay.

12. A protective system for a sectional current carrying line including, protective units connected with each end of a line section, and each including a circuit breaker controlling the line, a time delay trip relay controlling the breaker and operatively connected with a section of the line to be responsive to overcurrent in the line, and cut out means for the time delay relay, and control means connected with said line section and the cut out means of the units connected with said line section whereby the cut out means of a unit is operated upon overcurrent flow in a single direction in said section of the line, the control means including a fast overcurrent relay, a lock out relay controlling the cut out means, and a signal transmitter controlled by the lock out relay.

13. A protective system for a sectional current carrying line including, protective units connected with each end of a line section, and each including a circuit breaker controlling the line, a time delay trip relay controlling the breaker and operatively connected with a section of the line to be responsive to overcurrent in the line, and cut out means for the time delay relay, and control means connected with said line section and the cut out means of the units connected with said line section whereby the cut out means of a unit is operated upon overcurrent flow in a single direction in said section of the line, the control means including a signal receiver at the unit for operating the cut out means.

LLOYD F. HUNT.
FRED B. DOOLITTLE.